United States Patent [19]

Zimmerman et al.

[11] Patent Number: 5,846,594
[45] Date of Patent: Dec. 8, 1998

[54] METHOD OF PROCESSING SALMONOID FISH

[75] Inventors: Peter A. Zimmerman, Del Mar; Henry M. Bissell, IV, Los Angeles, both of Calif.; Gregory S. McIntosh, Halibut Cove, Ak.

[73] Assignee: Arctic Alaska Seafoods, Inc., Halibut Cove, Ak.

[21] Appl. No.: 724,054

[22] Filed: Sep. 23, 1996

Related U.S. Application Data

[60] Provisional application No. 60/004,372 filed Sep. 27, 1995.
[51] Int. Cl.$^6$ ..................................................... A22C 25/00
[52] U.S. Cl. ......................... 426/643; 426/401; 426/407; 426/412; 426/479
[58] Field of Search ..................................... 426/643, 652, 426/521, 478, 479, 399, 401, 641, 129, 412, 407

[56] References Cited

U.S. PATENT DOCUMENTS

| | | | |
|---|---|---|---|
| 1,970,308 | 8/1934 | Hopkinson | 426/643 |
| 2,373,988 | 4/1945 | Wuori | 426/407 |
| 2,411,736 | 11/1946 | Kleine | 426/407 |
| 2,493,586 | 1/1950 | Lang | 426/407 |
| 2,635,050 | 4/1953 | Stevenson | 426/407 |
| 3,347,012 | 10/1967 | Scholle | 426/399 |
| 3,594,191 | 7/1971 | Lapeyre | 426/479 |
| 3,622,356 | 11/1971 | Long | 426/521 |
| 3,706,333 | 12/1972 | Ammerman | 426/479 |
| 3,806,616 | 4/1974 | Mencacci | 426/479 |
| 4,087,563 | 5/1978 | Sekiguchi | 426/479 |
| 4,152,464 | 5/1979 | Brody | 426/399 |
| 4,233,320 | 11/1980 | Monaco | 426/399 |
| 4,279,934 | 7/1981 | Hutchison | 426/643 |
| 4,357,362 | 11/1982 | Barker | 426/407 |
| 4,798,728 | 1/1989 | Sugisawa | 426/643 |
| 4,840,805 | 6/1989 | Sugisawa | 426/643 |
| 4,842,872 | 6/1989 | Sugisawa | 426/641 |
| 4,871,565 | 10/1989 | Sugisawa | 426/407 |
| 4,937,092 | 6/1990 | Brotsky | 426/652 |
| 4,944,957 | 7/1990 | Kingsley | 426/652 |
| 4,978,546 | 12/1990 | Haram | 426/652 |
| 5,238,691 | 8/1993 | DeNike | 426/652 |
| 5,415,883 | 5/1995 | Leu | 426/641 |
| 5,543,163 | 8/1996 | Groves | 426/641 |

FOREIGN PATENT DOCUMENTS

| | | | |
|---|---|---|---|
| 6-7076 | 1/1994 | Japan | 426/643 |
| 6-78720 | 3/1994 | Japan | 426/643 |

OTHER PUBLICATIONS

Amstar Coys 1990 Vacuum Marinated Seafoods Provide Value–Added Opportunities for Processors Food Engineering May 1990 p.34.
Anon 1978 New Consumer Products Food Technology Sep. 1978 p. 98.
Anon 1988 Flavor Line Rubs Products the Right Way Prepared Foods Oct. 1988 p. 97.
Olney 1979 Fish Time–Life Books Alexandria VA pp. 12–15.
Borgstrom 1969 Fish as Food vol. III, Part 1 Academic Press New York pp. 165–168.
France 1977 Cooking Hints and Tips DK Publishing New York p. 54.
Stansby 1963 Industrial Fishery Technology Reinhold Publishing Co. New York pp. 113–118, 288–295.
Gisslen 1995 Professional Cooking John Wiley & Sons Inc New York pp. 324–328, 331, 332.
Komarek 1974 Food Products Formulary vol. 1 AVI Publishing Company Inc., Westport CT pp. 284,285.

*Primary Examiner*—Carolyn Paden
*Attorney, Agent, or Firm*—Henry M. Bissell

[57] ABSTRACT

Fish of the Salmonoid family (salmon, trout and their relatives) is preferably first trimmed to remove heads, tails, fins, entrails, skin and bones and cut into fillets or loins to facilitate further removal of dark meat, bone, bruised meat, blood and viscera. The remaining light meat is then vacuum tumbled with a marinade solution under reduced ambient pressures at rotational speeds and for times dependent upon the thickness of the fish fillets or loins. During the vacuum tumbling step, penetration of the marinade solution into the light meat is facilitated and thereby the mobility and accumulation of curd-forming, soluble fish proteins are greatly diminished, serving to fix such protein in place, to ultimately provide a greatly visually-reduced curd product. Additionally, this vacuum tumbling step softens any pin bones which may remain to ultimately provide a virtually boneless product. Thereafter, the product is weighed, hermetically sealed into containers, with or without the addition of supplemental ingredients in a "broth" solution, and is retorted at elevated temperature and pressure to heat-sterilize the product and to eliminate or render virtually invisible any remaining pin bones. The retorted, packaged product is then ready for storage, shipping and use. Preferably, the described method is carried out on an automated production line for high speed, economical processing to a superior ready-to-eat product.

28 Claims, No Drawings

METHOD OF PROCESSING SALMONOID FISH

CROSS-REFERENCE TO RELATED APPLICATION

This application claims the benefit of U.S. Provisional Application No. 60/004,372, filed Sep. 27, 1995.

BACKGROUND OF THE INVENTION

1. Field of the Invention.

The present invention generally relates to the processing of fish and, more particularly, relates to an improved method of processing salmonoid fish to achieve a more pleasing edible product.

2. Description of the Related Art

For the purposes of the following discussion, the words "chunk" and "flake" are used herein to reflect the definitions set forth in 21 Code of Federal Regulations sections 161.190 (a) (3) (ii) and (iii). The definitions are as follow:

"Chunk . . . consists of pieces . . . in which the original muscle structure is retained. The pieces may vary in size, but not less than 50 percent of the weight of the pressed contents of a container is retained on a ½ inch mesh screen."

"Flake . . . consists of pieces . . . in which more than 50 percent of the weight of the pressed contents of the container will pass through a ½ inch mesh screen, but in which the muscular structure of the flesh is retained."

CURRENT SALMON INDUSTRY PROCESSING PRACTICES

Processing techniques for producing hermetically sealed salmon products have remained unchanged for many decades. As virtually all of these products are produced from fresh salmon, salmon processing plants have long been forced to endure dramatic fluctuations of unpredictable salmon runs. As a result, these processing plants operate at full capacity during the few months during the year when the salmon are "running" (i.e., returning to spawn), only to be forced to either shut their doors or to shift production to accommodate another type of fish when the salmon runs are over. These severe fluctuations negatively impact the economic health of the communities surrounding the processing plants, as large numbers of employees are hired and laid off repeatedly throughout the year.

Of the hermetically sealed salmon products, the overwhelming majority are prepared by removing the heads, entrails, fins and tails from the fish and then cutting the body vertically into sections which are then placed in a can and retorted at high temperature and pressure. For purposes of convenience, this will be referred to herein as the "traditional" format. The final product is a can containing light and dark salmon meat, skin, back bone (vertebrae), belly-bones (ribs) and pin bones (small bones). As a result, the consumer must "clean" (i.e., remove skin and bones) the contents of the can in preparation for eating.

A small percentage of salmon products is canned in a format commonly referred to as "skinless-boneless." However, this format also has a number of drawbacks which have prevented it from achieving wide consumer acceptance. Despite the label's proclaiming "skinless, boneless," the salmon meat still contains identifiable undesirable pin bones. While these bones are softened to some extent by the heat and pressure of the retort process, the visible presence of bones negatively impacts the marketability of the product. In addition, the meat consists of both the light and dark portions of the salmon flesh, thus presenting the consumer with a strong smelling, often bitter tasting product. The importance of this distinction is explained more thoroughly hereinafter.

LIGHT MEAT AND DARK MEAT

Salmon meat, like that of many fishes, consists of both light meat and dark meat. The dark meat is sometimes referred to as the "fat line" or "blood line." In both the "traditional" (i.e., skin-on, bone-in) and the so-called "skinless-boneless" formats, the presence of this dark meat gives the final product a strong flavor and "fishy" odor. As a result, the dark meat itself is considered to be undesirable, as it can be quite bitter tasting, with a strong fishy odor which gives the meat a sharp, unpleasant aftertaste, known as "bite." None of the salmon processing methods currently in use is economically able to overcome the negative aspects inherent in dark meat.

While the "traditional" format has long been the standard method of canning salmon, today's consumer desires a ready-to-eat, skinless, truly boneless, user friendly, hermetically sealed product that is not provided by this method. When consumers compare traditionally canned salmon to canned tuna, chicken or turkey, they increasingly choose the "cleaner," more convenient, tuna, chicken or turkey product over the canned salmon. As a result of changes in consumer preference, canned salmon has lost enormous market share over the past twenty years.

With the ever-increasing number of ready-to-eat hermetically sealed "meat" products available to today's consumer, the presence and appearance of skin and bones (including backbone, belly-bones and pin-bones) in the "traditional" format of canned salmon are considered to be major impediments to gaining increased consumer acceptance. While the "skinless-boneless" format has fewer bones, the presence, appearance and strong bitter flavor of dark meat have proven great obstacles to gaining market share.

In addition to the problems of dark meat in the final product, canned salmon has another drawback which negatively impacts the product's marketability. This problem is the presence of "curd." Curd consists of coagulated soluble fish proteins produced by the heat of the retort process. Curd is considered unsightly, and may account for up to 4% or more of canned salmon by weight.

While curd does not present a nutritional defect, it can be the source of consumer complaints and thereby lowers both the grade and economic value of the product. Curd is typically encountered in salmon which have been frozen prior to canning, but may also form in varying amounts in fish canned fresh, depending upon the length of time the fish are held prior to canning.

In order to minimize the negative visual effects of curd upon the consumer, canneries will often place cans in the retorts upside down. By so doing, the curd rises to form at what will become, after labelling, the bottom of the can. In addition, extensive laboratory research is being conducted in efforts to prevent curd formation through the use of additives such as polyphosphates. The use of chemicals such as polyphosphates, however, is increasingly perceived by the consumer as a negative feature of food. Except through the use of chemicals, no other current method of processing salmon is able to achieve a curd-free final product.

None of the currently available types of equipment and processing techniques for salmon and other salmonoid fish are capable of overcoming the previously described drawbacks. Accordingly, there remains a need for an improved method of processing salmonoid type fish in an economical manner which results in a superior finished product having none of the indicated defects. Such product should be of superior appearance, and have aesthetic appeal, good flavor and texture, and provide ease of use. All bones, skin, and dark meat should be essentially absent from the finished product so that it can be used directly from its container without requiring cooking, stripping or other manipulation by the consumer. All parts of the finished product should be useable so that there is little or no waste.

SUMMARY OF THE INVENTION

The present method satisfies all the foregoing needs. The method is simple, cost effective and capable of being carried out in an essentially automated manner. The method is substantially as set forth in the ABSTRACT OF THE DISCLOSURE and is capable of being carried out in a variety of modes, depending on the desired end use of the finished product.

The finished product in any event has no visible bones, no objectionable odor or bitter taste and is skinless and highly palatable. It contains no dark meat or distinctly visible curd, but is all clean, cooked light meat in either chunk or flaked style suitable for salads, spreads, sandwiches, casseroles, etc. Moreover, the finished salmonoid fish product is produced in accordance with the present method at a unit cost which is competitive with the highest grade canned tuna; i.e., white meat albacore.

The term "salmonoid" is used herein to refer to fish of the family Salmonidae. In addition to all trouts, this family includes, but is not limited to, the following Pacific salmon species:

Oncorhynchus tshawytscha (Chinook, King, or Spring)

Oncorhynchus nerka (Blueback, Red, Sockeye)

Oncorhynchus kisutch (Coho, Silver)

Oncorhynchus gorbuscha (Pink)

Oncorhynchus keta (Chum, or Keta)

Oncorhynchus masou (Masou, or Cherry)

In brief, one mode in accordance with the method of the present invention involves the processing of various forms of salmonoid fish by means of vacuum tumbling. Vacuum tumbling is achieved by placing the fish in a rotating drum to which a marinade solution is added. After reducing ambient pressure inside the drum, the drum is rotated to facilitate the thorough penetration and distribution of the marinade solution throughout the fish meat, thereby reducing the migration and accumulation of soluble fish proteins to external meat surfaces (which leads to visible curd formation). This process creates a finished product which has a superior visual appearance, compared with fish meat prepared by other methods. Further processing in accordance with the present claimed method results in a final product which consists of skinless, virtually boneless, greatly curd-reduced, chunk/flake style, light meat salmon packaged in a hermetically sealed container which has been retorted prior to marketing.

In accordance with the method of the present invention, fish of the salmonoid group may be processed from a variety of forms. These forms include fish with the head and entrails removed ("headed and gutted" or "H&G"), headed and gutted with fins and tails removed ("cannery cut") and fillets. The filleted forms which may be used include skin-on fillets, skin-off fillets, fillets with belly-bones in or belly-bones out, and "deep-skinned" fillets (in which a thin layer of meat is removed along with the skin). All of these forms may be processed from either fresh or frozen fish.

In the method of the present invention, remaining skin and dark meat are removed by either manual or automated means or a combination thereof. Such means may include, either individually or in combination, the use of peelers, scrapers, stationary or rotating knives, stationary or rotating brushes, or jets of water, steam or air.

In the method of the present invention, the aforementioned forms of salmon are vacuum tumbled, preferably by placing the fish, along with a marinade solution, in a drum, reducing the ambient pressure within the drum and then rotating it.

After remaining skin and dark meat have been removed, the resulting product in the form of clean light meat is placed, along with any supplemental ingredients desired, e.g., flavoring agents, etc., into suitable containers in preparation for hermetic sealing and retorting. The containers may consist of either cans, glass jars, or retortable plastic, metal foil or plastic-metal foil laminated pouches. One such pouch utilizes a laminated construction consisting of plies of polyester film, nylon film, aluminum foil and polypropylene film to provide a sturdy package able to resist retort temperatures and effectively protect the fish contained therein from deterioration, due to the pouch's low gas permeability. The retortable pouch is the preferred container for the method of the present invention, due to its convenience and savings in handling, shipping, storage and disposal. Retorting is carried out at an elevated temperature sufficient to sterilize the product (e.g., at about 242 degrees F. for a period of about 150 minutes), after which it is ready for storage, shipment and use.

Further details of the present invention are set forth in the following detailed description of the flow chart set forth herein and description of the preferred embodiments.

DETAILED DESCRIPTION

FLOW CHART FOR SALMONOID FISH PREPARATION BY PRESENT METHOD

I. Preparing fresh or frozen fish in a fish preparation zone, preferably into one of the following formats:

A. H&G (headed & gutted, i.e., head and entrails removed);

B. Fillet: skin-on, backbone removed, belly bones in, pin bones in;

C. Fillet: skin-on, backbone and belly bones removed, pin bones in;

D. Fillet: skin-on, backbone and belly bones removed, pin bones out;

E. Fillet: skinless, backbone removed, belly bones in, pin bones in;

F. Fillet: skinless, backbone and belly bones removed, pin bones in;

G. Fillet: skinless, backbone and belly bones removed, pin bones out;

H. Fillet: deep-skinned, backbone removed, belly bones in, pin bones in;

I. Fillet: deep-skinned, backbone and belly bones removed, pin bones in;

J. Fillet: deep-skinned, backbone and belly bones removed, pin bones out.

II. Passing the fish to a stripping zone and removing any dark meat and skin by hand and/or by mechanical means;

III. Placing formatted fish in a vacuum tumbling machine along with a marinating solution with ingredients added for flavoring, texture, coloring, improved fluid retention and reduction of oxidation in order to assist in the distribution and penetration of such ingredients uniformly throughout the meat to soften remaining bones (if present), and in reducing migration and accumulation of soluble fish proteins (which lead to visible curd formation) on external meat surfaces;

IV. Passing the fish to a weighing zone where fish are weighed into proper pouching amounts;

V. (Optional Step) Passing the fish to an ingredients zone where one or more of oil, water, salt, anti-oxidants, meat or vegetable extract and coloring agents are mixed with fish;

VI. Passing the fish to a vacuum sealing zone where the fish are vacuum sealed into suitable containers (pouches, cans, jars, etc.);

VII. Passing the fish to a retort zone where the vacuum sealed packaged fish are sterilized at elevated temperature to kill bacteria and dissolve or reduce in size to substantial invisibility any remaining pin bones; and VIII. Passing the finished vacuum sealed, sterilized packaged fish product to a cooling and storage zone.

It should be understood that the above flow chart indicates that the fish are processed in accordance with the present method as they are passed sequentially from one zone to the next in a system which is, preferably, at least partially automated. If desired, the sequence of steps comprising the present method could be carried out with or without full or partial automation and in one or a plurality of zones, as dictated by the equipment at hand.

DESCRIPTION OF THE PREFERRED EMBODIMENTS

The most preferred salmonoid product form to be processed in accordance with the present invention consists of what are commonly referred to as "skinless, boneless, deep-skinned" fillets. These fillets have the backbone (vertebrae) and belly-bones (ribs) removed, but have pin-bones remaining. Additionally, the fillets have been "deep-skinned" in that, when the skin was removed from the fillets, a thin layer of meat immediately adjacent the skin was also removed. In accordance with the present invention, this form, as with all other forms of salmon, may be processed from fresh or frozen fish.

A preferred method of processing in accordance with the present invention is to place the fillets in a vacuum tumbling machine along with a marinade of ingredients added to improve flavor, texture, color and fluid retention. Through the application of a partial vacuum to fillets placed in a rotating, sealed drum, the distribution and penetration of ingredients throughout the meat is greatly accelerated. The fillets are vacuum tumbled under reduced ambient pressure for a period of time before they are removed and advanced to the next station.

Depending upon the thickness of the fillets or other form of salmonoid fish being vacuum tumbled, the internal ambient pressure and duration of the vacuum tumbling cycle will vary. In one example, Pink salmon fillets are prepared. An average Pink salmon fillet has a thickness of approximately 7/8 inch. The fillets are placed in a drum with a marinade solution comprising approximately 10–20% of total drum contents' weight. The pressure inside the vacuum tumbler drum is reduced to approximately 15–25" Hg (inches of mercury), and the drum is rotated (tumbled) at approximately 6–10 rpm for between 5 and 20 minutes.

In another example, Chum salmon fillets are prepared. An average Chum salmon fillet has a thickness of approximately 1 3/8 inches. The fillets are placed in a drum with a marinade solution comprising approximately 10–20% of total drum contents' weight. The pressure inside the vacuum tumbler drum is reduced to approximately 15–25" Hg and the drum is rotated (tumbled) at approximately 6–10 rpm for between 10 and 25 minutes.

In another example, Silver salmon fillets are prepared. An average Silver salmon fillet has a thickness of approximately 1 3/8 inches. The fillets are placed in a drum with a marinade solution comprising approximately 10–20% of total drum contents' weight. The pressure inside the vacuum tumbler drum is reduced to approximately 15–25" Hg and the drum is rotated (tumbled) at approximately 6–10 rpm for between 10 and 25 minutes.

In another example, Sockeye salmon fillets are prepared. An average Sockeye salmon fillet has a thickness of approximately 1 1/8 inches. The fillets are placed in a drum with a marinade solution comprising approximately 10–20% of total drum contents' weight. The pressure inside the vacuum tumbler drum is reduced to approximately 15–25" Hg and the drum is rotated (tumbled) at approximately 6–10 rpm for between 8 and 20 minutes.

In another example, King salmon fillets are prepared. An average King salmon fillet has a thickness of approximately 2 1/4 inches. The fillets are placed in a drum with a marinade solution comprising approximately 10–20% of total drum contents' weight. The pressure inside the vacuum tumbler drum is reduced to approximately 15–25" Hg and the drum is rotated (tumbled) at approximately 6–10 rpm for between 15 and 30 minutes.

In another example, farm-raised Rainbow trout fillets are prepared. An average farm-raised Rainbow trout fillet has a thickness of approximately 3/4 inch. The fillets are placed in a drum with a marinade solution comprising approximately 10–20% of total drum contents' weight. The pressure inside the vacuum tumbler drum is reduced to approximately 15–25" Hg and the drum is rotated (tumbled) at approximately 6–10 rpm for between 5 and 15 minutes.

As evidenced above, a wide range of parameters exists for conducting the vacuum tumbling of salmonoids. Pink salmon fillets may vary in thickness, from 5/8" to 1 1/2". Chum salmon fillets may vary in thickness, from 1" to 1 7/8". King salmon fillets may vary in thickness, from 1 1/2" to over 3". Silver salmon fillets may vary in thickness from 3/4" to 2". Farmed rainbow trout fillets may vary in thickness from 3/8" to 1". The internal ambient pressure of the vacuum tumbler may be varied from 10 to 25 inches of mercury. Accordingly, tumbling times may vary from as little as five minutes, when vacuum tumbling thin Pink salmon fillets at high vacuum, to as much as 30 minutes or more, when tumbling thick King salmon fillets at lower vacuum levels.

After vacuum tumbling, the light meat is then weighed into portions for packaging, and desired ingredients (if any) are added. In one example, spring water, vegetable extract and salt are added to improve texture and flavor.

In the next stage of the present method, in one example the fish meat and any ingredients which have been mixed therewith are then placed into a retortable, laminated, plastic and metal foil pouch. The pouch is then placed into a vacuum/sealer machine which removes excess air from the pouch and then seals the pouch. The sealed pouch then proceeds to the retort stage, in which it is subjected to elevated temperatures in order to effectively sterilize the contents of the pouch.

In one example, a pouch is filled with 4 pounds of light meat and ingredients, then retorted at a temperature in excess of about 212 degrees Fahrenheit, e.g., at 242 degrees Fahrenheit for about 150 minutes. In another example, a pouch is filled with 1 pound of light meat and ingredients, then retorted at 242 degrees Fahrenheit for 50–100 minutes.

Further details of the present method are set forth in the following Specific Examples.

EXAMPLE I

In a first run 1000 pounds of whole Pink salmon are processed in a fish preparation zone into "skinless, boneless" trimmed fillets (i.e., backbone and belly-bone removed, pin-bone in), having an average size of about fourteen inches length, four inches width and seven-eighths of an inch thickness.

The fillets are then passed on the conveyor belt to a trimming station and trimmed at that station of any remaining skin and dark meat, bone (excluding the pin bones), bruised meat, blood and viscera by means of stationary or rotating knives and scrapers.

The resulting light meat, skinless, boneless fillets are then placed in a vacuum tumbler along with a marinade solution to improve flavor, texture, color, appearance, and reduce migration and accumulation of soluble ("curd-forming") fish proteins. Through this reduction of migration and accumulation, these potentially curd-forming proteins are "fixed" and thereby restricted in their ability to gather and form objectionable amounts of curd.

The marinade solution may be comprised of the following ingredients in the ranges specified: water, comprising from 5 to 20% of tumbler net weight; salt, comprising from 0 to 2% of tumbler net weight; anti-oxidants, either natural or synthetic, comprising from 0 to 2.5% of tumbler net weight; coloring agents, comprising from 0 to 2.5% of tumbler net weight; oil (e.g., vegetable, corn, canola, olive, or safflower), comprising from 0 to 3.0% of tumbler net weight; and vegetable extract, comprising from 0 to 10% of tumbler net weight.

The following composition is a preferred example of such a marinade solution (the constituents are set out as percentages of tumbler net weight):

| | |
|---|---|
| Water | 8.7% |
| Salt | 0.8% |
| Anti-oxidants | 0.5% |
| Vegetable Extract | 0.5% |
| Coloring Agents | 0.02% |

The vacuum-tumbled fillets are then collected at a packing station where they are packed and sealed into the following types of containers: laminated retortable foil pouches, glass jars and metal cans. A preferred retortable foil pouch for this use is about 8½ inches wide by 14½ inches long with walls about 5.5 mils thick, comprising laminated layers of polyester film, nylon film, aluminum foil and cast polypropylene film. This construction is capable of withstanding retort temperatures as high as 245 degrees Fahrenheit for extended periods of time. Moreover, its walls are resistant to puncturing, wear and cracking. Because the pouch has very low gas permeability, it serves as an effective protection for the fish product therein against oxidative deterioration. Other sizes of retort pouches can be used, along with different pouch constructions which provide the pouches with characteristics similar to those just described.

The packaged fish fillets are then loaded into a retort consisting of a chamber in which they are subjected to elevated temperatures and pressures sufficient to effectively eliminate any health risks posed by harmful bacteria. During the retort stage, the temperature inside the retort is raised to approximately 242 degrees Fahrenheit and maintained for between 90 and 150 minutes. As a result, the packaged fillets are fully sterilized and pin bones, which were softened during vacuum tumbling, either fully dissolve or are rendered into softened, pulpy fragments so small as to be essentially invisible.

In a second run, the same processing technique is applied as in the first run, except that upon the packing of the finished fillets into containers, a broth solution comprising the following ingredients in the ranges specified is added to improve flavor, texture and appearance: vegetable extract, comprising from 0 to 5% of container net weight; salt, comprising from 0 to 2% of container net weight; sugar, comprising from 0 to 2% of container net weight; water, comprising from 2 to 12% of container net weight; natural or synthetic anti-oxidants, comprising from 0 to 3% of container net weight; oil (e.g., olive, vegetable, corn, canola, or safflower), comprising from 0 to 5% of container net weight; and/or coloring agents according to choice.

A preferred example of a broth solution to be added during the packing of fish fillets into containers comprises the following constituents (listed as percentages of container net weight):

| | |
|---|---|
| Water | 8.0% |
| Sugar | 0.9% |
| Salt | 0.5% |
| Vegetable extract | 0.09% |
| Anti-oxidants | 0.02% |
| Coloring agents | 0.005% |

In a third run the same processing technique is applied as in the first run, except that the vacuum in the tumbler and the time of tumbling are adjusted to the following: 10 inches of mercury and 30 minutes.

In a fourth run the same processing technique is applied as in the first run, except that the vacuum in the tumbler and the time of tumbling are adjusted to the following: 25 inches of mercury and 3 minutes.

All four runs produced clean, cooked, hermetically sealed salmonoid fish fillets in chunk or flake style, ready to eat and, to the maximum extent possible, devoid of skin, dark meat, visible bones, strong odor and bitter flavor, with minimal formations of objectionable curd. The resulting chunk/flake style, light meat, salmon provides a superior product which needs no preparation ("cleaning") by the consumer before use.

EXAMPLE II

In a fifth run the same processing technique is applied as in the first run of Example I, except that the fillets, before vacuum tumbling, are trimmed at the trimming station of any remaining skin and dark meat through the use of mechanical blades, abraders, scrapers, and/or brushes for faster, more economical production of finished product.

In a sixth run the same processing technique is applied as in the first run of Example I, except that the fillets, before vacuum tumbling, are automatically trimmed at the trimming station of any remaining skin and dark meat through the use of pressurized jets of air.

In a seventh run the same processing technique is applied as in the first run of Example I, except that the fillets, before vacuum tumbling, are automatically trimmed at the trimming station of any remaining skin and dark meat through the use of pressurized jets of water.

In an eighth run the same processing technique is applied as in the first run of Example I, except that the fillets are placed directly upon a moving conveyor belt for passage through subsequent stages of the process.

EXAMPLE III

In a ninth run the same processing technique is applied as in the first run of Example I, except that 1000 pounds of whole Chum salmon are processed into "skinless, boneless" trimmed fillets (i.e., skin, dark meat, backbone and belly-bones removed, pin-bones in), having an average size of about 22 inches length, 7 inches width and 1⅜ inch thickness, and placed in a vacuum tumbling machine along with a marinade of ingredients added to improve flavor, texture, color, and reduce migration and accumulation of soluble fish proteins. The fillets are vacuum tumbled for from five to thirty minutes under a vacuum from 25 to 5" of mercury, the tumbling time varying inversely with the level of vacuum over the ranges specified, to ensure effective distribution and penetration of the marinade ingredients. The tumbled fillets are then advanced to the next zone for portioning.

In a tenth run the same processing technique is applied as in the ninth run, except that tumbling vacuum and time are adjusted to the following: 25 inches of mercury and 5 minutes.

In an eleventh run the same processing technique is applied as in the ninth run, except that tumbling vacuum and time are adjusted to the following: 5 inches of mercury and 30 minutes.

In a twelfth run the same processing technique is applied as in the eleventh run, except that 1000 pounds of whole Chum salmon are formatted into "boneless" fillets (i.e., backbone and belly-bone-removed, pin-bone in, skin-on), having an average size of about 22 inches length, 7½ inches width and 1½ inch thickness, for further processing.

In a thirteenth run the same processing technique is applied as in the ninth run, except that 1000 pounds of whole Chum salmon are processed into headed and gutted, fins-and-tail-removed "cannery cut" format, having an average size of about 24 inches length, 7½ inches width and 4 inches thickness, for further processing.

In a fourteenth run the same processing technique is applied as in the ninth run, except that 1000 pounds of whole Chum salmon are formatted into trimmed fillets from which the skin, dark meat, backbone, belly bones and pin bones have been removed. These fillets, having an average size of about 22 inches length, 7 inches width and 1⅜ inches thickness, are further processed as indicated above.

In each of the fourteen runs comprising the three Specific Examples, the finished fish meats are fully cooked and flavorful, and form a product which is of the flake or chunk description, containing no strong flavor or bitter aftertaste, having only light meat with no skin, visually objectionable bones or curd, so that such product is of optimal quality with maximum consumer appeal.

A marinade solution prepared in accordance with one of those specified hereinabove may be added to the fillets in the vacuum tumbler as described for the first run and/or a broth solution may be added during the packing of the finished fillets as described for the second run, when the fillets are prepared as set forth above for any of the various runs of Examples I, II, or III.

Accordingly, the present method, which is cost effective and can be fully automated, if desired, provides a superior product with high consumer appeal. Various alterations, changes, modifications and additions can be made in the improved method of the present invention, its steps and parameters. All such modifications, changes, alterations and additions as are within the scope of the appended claims form part of the present invention.

What is claimed is:

1. A method of processing salmonoid fish to provide an improved food product devoid of visible bones, skin and dark meat and having no objectionable odor or bitter taste, said method comprising the steps of:

receiving individual fish and preparing each fish in accordance with a selected format;

removing from each fish in said selected format any remaining skin and dark meat;

preparing a marinating solution from selected ingredients in accordance with properties including flavor, color and texture to be achieved in the finished product;

placing the formatted fish in a vacuum tumbling machine together with a predetermined amount, relative to the quantity of fish meat, of said marinating solution;

operating the vacuum tumbling machine for a selected time, speed, temperature and degree of vacuum to facilitate penetration of the fish meat by said marinating solution;

removing the fish meat from the vacuum tumbling machine and separating the fish meat into portions of a selected size for packaging;

placing said portions of fish meat into individual retortable pouches;

vacuum sealing said retortable pouches with packaged fish meat portions inside;

moving said retortable pouches of packaged fish meat portions to a retort zone;

retorting said retortable pouches at a selected elevated temperature for a selected time sufficient to sterilize said packaged fish meat portions by killing bacteria and to dissolve any remaining pin bones; and passing a finished vacuum-sealed, sterilized, packaged fish meat product to a cooling and storage zone.

2. The method of claim 1 wherein said selected format comprises headed & gutted fish.

3. The method of claim 1 wherein said selected format is fillet with skin-on, backbone removed, belly bones in and with pin bones in.

4. The method of claim 1 wherein said selected format is fillet with skin-on, backbone and belly bones removed, and with pin bones in.

5. The method of claim 1 wherein said selected format is fillet with skin-on, backbone and belly bones removed, and with pin bones out.

6. The method of claim 1 wherein said selected format is skinless fillet with backbone removed, belly bones in, and with pin bones in.

7. The method of claim 1 wherein said selected format is skinless fillet with backbone and belly bones removed, and with pin bones in.

8. The method of claim 1 wherein said selected format is skinless fillet with backbone and belly bones removed, and with pin bones out.

9. The method of claim 1 wherein said selected format is deep-skinned fillet with backbone removed, belly bones in, and with pin bones in.

10. The method of claim 1 wherein said selected format is deep-skinned fillet with backbone and belly bones removed and with pin bones in.

11. The method of claim 1 wherein said selected format is deep-skinned fillet with backbone and belly bones removed and with pin bones out.

12. The method of claim 1 wherein the selected ingredients of said marinating solution comprise water in an amount from 5 to 20% of tumbler net weight, salt in an amount from 0 to 2% of tumbler net weight, anti-oxidants from 0 to 2.5% of tumbler net weight, coloring agents from 0 to 2.5% of tumbler net weight, oil from 0 to 3.0% of tumbler net weight and vegetable extracts from 0 to 10% of tumbler net weight.

13. The method of claim 12 wherein said ingredients comprise 8.7% water, 0.8% salt, 0.5% anti-oxidants, 0.5% vegetable extracts and 0.02% coloring agents, all of said percentages being related to tumbler net weight.

14. The method of claim 1 further comprising the steps of preparing a broth solution from ingredients selected to improve flavor, color and texture and adding a predetermined amount of said broth solution to individual fish meat portions in said retortable pouches prior to the vacuum sealing step.

15. The method of claim 14 wherein said selected ingredients of said broth solution comprise vegetable extracts in an amount from 0 to 5% of retortable pouch net weight, salt in an amount from 0 to 2% of retortable pouch net weight, sugar in an amount from 0 to 2% of retortable pouch net weight, water in an amount from 2 to 12% of retortable pouch net weight, anti-oxidants in an amount from 0 to 3% of retortable pouch net weight, oil in an amount from 0 to 5% of net weight, and selected coloring agents.

16. The method of claim 15 wherein said selected ingredients of said broth solution comprise the following constituents listed as percentages of retortable pouch net weight: water, 8.0%; sugar, 0.9%; salt, 0.5%; vegetable extracts, 0.09%; ant-oxidants, 0.02%; and coloring agents, 0.005%.

17. The method of claim 1 wherein the individual fish in the receiving step are frozen.

18. The method of claim 1 wherein the individual fish in the receiving step are fresh fish.

19. The method of claim 1 wherein the retortable pouches comprise laminated layers of polyester film, nylon file, aluminum foil and cast polypropylene film.

20. The method of claim 1 wherein the step of operating the vacuum tumbling machine further includes the steps of reducing the pressure inside the vacuum tumbler drum to approximately 10–25" Hg and rotating the drum at approximately 6–10 rpm for between 5 and 30 minutes for fillets having a thickness in the range of $\frac{1}{2}$" to $2\frac{1}{2}$".

21. The method of claim 20 wherein for fillets of Pink salmon, Chum salmon, Silver salmon, Sockeye salmon, King salmon, and Rainbow trout with a thickness of fillets in the range of $\frac{3}{4}$41 to $2\frac{1}{4}$" the pressure inside the vacuum tumbler drum is reduced to approximately 15–25" of Hg.

22. The method of claim 21 wherein the tumbling time for fillets of Rainbow trout having a thickness of approximately $\frac{3}{4}$" is between 5 and 15 minutes.

23. The method of claim 21 wherein the tumbling time for fillets of Pink salmon having a thickness of approximately $\frac{7}{8}$" is between 5 and 20 minutes.

24. The method of claim 21 wherein the tumbling time for fillets of Sockeye salmon having a thickness of approximately $1\frac{1}{8}$" is between 8 and 20 minutes.

25. The method of claim 21 wherein the tumbling time for fillets of Chinook salmon having a thickness of approximately $1\frac{3}{8}$" is between 10 and 25 minutes.

26. The method of claim 21 wherein the tumbling time for fillets of Silver salmon having a thickness of approximately $1\frac{3}{8}$" is between 10 and 25 minutes.

27. The method of claim 21 wherein the tumbling time for fillets of Chum salmon having a thickness of approximately $1\frac{3}{8}$" is between 10 and 25 minutes.

28. The method of claim 21 wherein the tumbling time for fillets of King salmon having a thickness of approximately $2\frac{1}{4}$" is between 10 and 25 minutes.

* * * * *